United States Patent
Manolakos et al.

(10) Patent No.: US 11,438,196 B2
(45) Date of Patent: Sep. 6, 2022

(54) CONFIGURATION CONSTRAINTS FOR SOUNDING REFERENCE SIGNALS (SRS) FOR POSITIONING

(71) Applicant: QUALCOMM Incorporated, San Diego, CA (US)

(72) Inventors: Alexandros Manolakos, San Diego, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/889,411

(22) Filed: Jun. 1, 2020

(65) Prior Publication Data

US 2021/0067382 A1 Mar. 4, 2021

Related U.S. Application Data

(60) Provisional application No. 62/891,813, filed on Aug. 26, 2019.

(51) Int. Cl.
*H04L 25/02* (2006.01)
*H04W 76/27* (2018.01)
(Continued)

(52) U.S. Cl.
CPC ......... *H04L 25/0226* (2013.01); *H04L 5/001* (2013.01); *H04L 5/005* (2013.01);
(Continued)

(58) Field of Classification Search
None
See application file for complete search history.

(56) References Cited

U.S. PATENT DOCUMENTS

| | | | |
|---|---|---|---|
| 2018/0359781 A1* | 12/2018 | Yoon | H04W 16/10 |
| 2019/0174466 A1* | 6/2019 | Zhang | H04L 5/0048 |
| 2019/0268185 A1* | 8/2019 | Wang | H04L 5/0051 |

OTHER PUBLICATIONS

Huawei, et al., "SRS Design for NR Positioning", 3GPP TSG RAN WG1 Meeting #97, 3GPP Draft;R1-1906053, 3rd Generation Partnership Project (3GPP), Mobile Competence Centre ; 650, Route des-Lucioles; F-06921 Sophia-Antipolis Cedex; France, vol. RAN WG1, No. Reno, USA; 28190513-28190517, May 13, 2019 (May 13, 2019), 10 Pages, XP851727510, Retrieved from the Internet: URL: http://www.3gpp.org/ftp/Meetings%5F3GPP%5FSYNC/RAN1/Docs/R1%2D1906053%2Ezip [retrieved on May 13, 2019], Title; Sections 2.2.4.

(Continued)

*Primary Examiner* — Diane L Lo
(74) *Attorney, Agent, or Firm* — Qualcomm Incorporated

(57) ABSTRACT

Disclosed are techniques for wireless communication. In an aspect, a user equipment (UE) receives at least one of a first type of sounding reference signal (SRS) configuration or a second type of SRS configuration, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, and wherein the first higher layer protocol signaling is different from the second higher layer protocol signaling, and transmits one or more SRS-for-positioning purposes based on the first or second type of SRS configuration.

26 Claims, 22 Drawing Sheets

1100

Receive at least one of a first type of SRS configuration or a second type of SRS configuration , wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, and wherein the first higher layer protocol signaling is different from the second higher layer protocol signaling — 1110

Transmit one or more SRS-for-positioning purposes based on the first type of SRS configuration or the second type of SRS configuration — 1120

(51) Int. Cl.
  *H04L 5/00* (2006.01)
  *H04W 64/00* (2009.01)
  *H04W 80/08* (2009.01)
(52) U.S. Cl.
  CPC ......... *H04L 5/0092* (2013.01); *H04W 64/006* (2013.01); *H04W 76/27* (2018.02); *H04W 80/08* (2013.01)

(56) References Cited

OTHER PUBLICATIONS

Huawei, et al., "SRS Design for NR Positioning", 3GPP TSG RAN WG1 Meeting #97, 3GPP Draft;R1-1906053, 3rd Generation Partnership Project (3GPP), Mobile Competence Centre ; 650, Route des-Lucioles; F-06921 Sophia-Antipolis Cedex; France, vol. RAN WG1, No. Reno, USA; 28190513-28190517, May 13, 2019 (May 13, 2019), 10 Pages, XP851727510, Retrieved from the Internet: URL: http://www.3gpp.org/ftp/Meetings%5F3GPP%5FSYNC/RAN1/Docs/R1%2D1906053%2Ezip [retrieved on May 13, 2019], Title; Sections 2.2.4, 2.4, 2.5.
International Search Report and Written Opinion—PCT/US2020/045635—ISA/EPO—dated Nov. 9, 2020.

* cited by examiner

User Plane Protocol Stack

Control Plane Protocol Stack

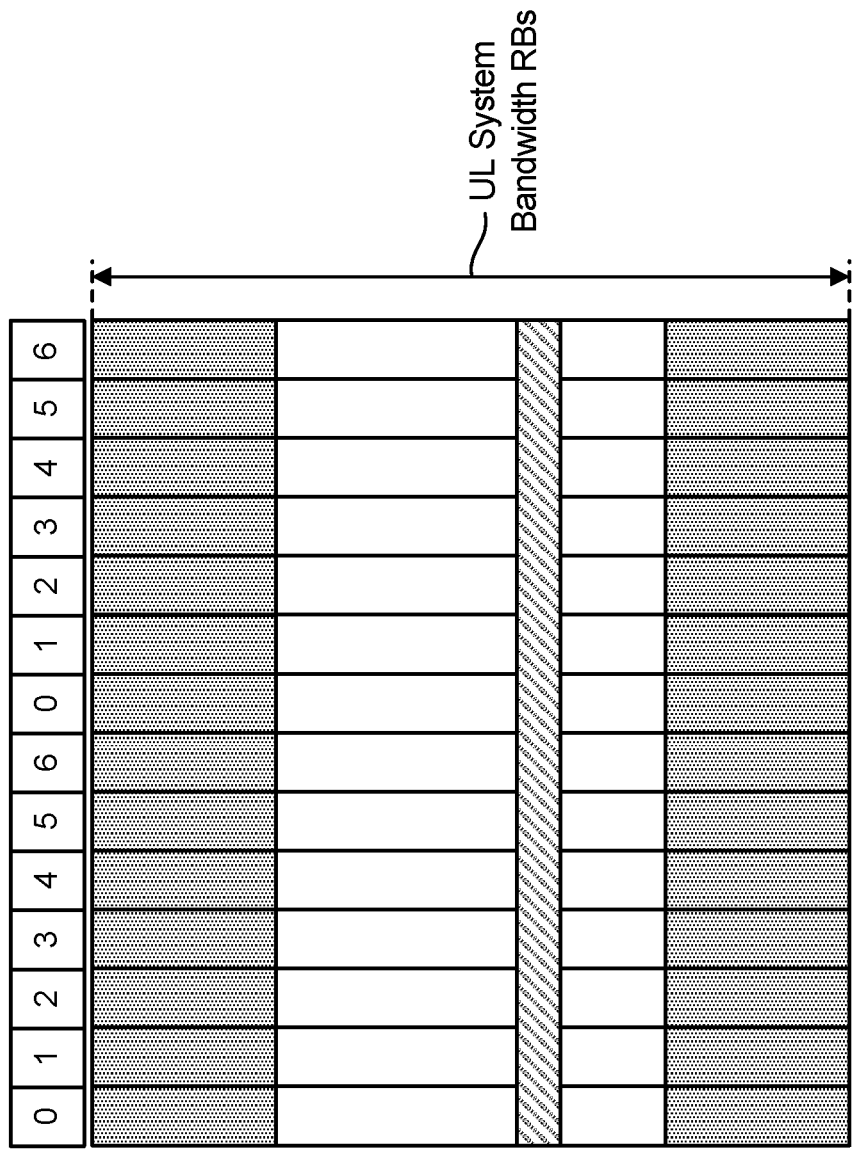
FIG. 5D
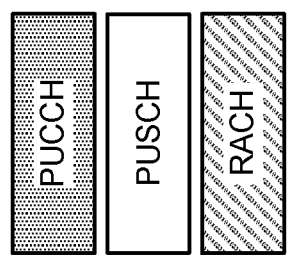

SRS-Config Information Element

```
-- ANSISTART
-- TAG-SRS-CONFIG-START

SRS-Config ::=                      SEQUENCE {
    srs-ResourceSetToReleaseList        SEQUENCE (SIZE (1..maxNrofSRS-ResourceSets)) OF SRS-ResourceSetId
    srs-ResourceSetToAddModList         SEQUENCE (SIZE (1..maxNrofSRS-ResourceSets)) OF SRS-ResourceSetId
    srs-ResourceToReleaseList           SEQUENCE (SIZE (1..maxNrofSRS-Resource)) OF SRS-ResourceId
    srs-ResourceToAddModList            SEQUENCE (SIZE (1..maxNrofSRS-Resource)) OF SRS-Resource
    tpc-Accumulation                    ENUMERATED {disabled}
    ...
}

SRS-ResourceSet ::=                 SEQUENCE {
    srs-ResourceSetId,
    srs-ResourceIdList                  SEQUENCE (SIZE (1..maxNrofSRS-ResourcepERSet)) OF SRS-ResourceId
    resourceType                        CHOICE {
        aperiodic                           SEQUENCE {
            aperiodicSRS-ResourceTrigger        INTEGER (1..maxNroSRS-TriggerStates-1),
            csi-RS                              NZP-CSI-RS-ResourceID
```

```
                    slotOffset                          INTEGER (1..32)
                    ...,
                    [[
                    aperiodicSRS-ResourceTriggerList-v1530   SEQUENCE (SIZE(1
                                                                      OF INTEGER (1..
                    ]]
                },
                semi-persistent                         SEQUENCE {
                    associatedCSI-RS                        NZP-CSI-RS-Resource
                    ...
                },
                periodic                                SEQUENCE {
                    associatedCSI-RS                        NZP-CSI-RS-Resource
                    ...
                }
            },
            usage                                   ENUMERATED {beamManagement,
            alpha                                   Alpha
            p0                                      INTEGER (-202..24)
            pathlossReferenceRS                     CHOICE {
                ssb-Index                               SSB-Index,
                csi-RS-Index                            NZP-CSI-RS-ResourceId
            }
            srs-PowerControlAdjustmentStates        ENUMERATED { sameAsFci2, sepa
            ...
        }

SRS-ResourceSetId ::=                       INTEGER (0..maxNrofSRS-ResourceS  ─(A)

SRS-Resource ::=                            SEQUENCE {
            srs-ResourceID                              SRS-ResourceID,
            nrofSRS-Ports                               ENUMERATED {port1, ports2, ports
            ptrs-PortIndex                              ENUMERATED {n0. n1 }
            transmissionComb                            CHOICE {
                n2                                          SEQUENCE {
                    combOffset-n2                               INTEGER (0..1),
                    cyclicShift-n4                              INTEGER (0..7)
                }
            },
                n4                                          SEQUENCE {
                    combOffset-n4                               INTEGER (0..3),
                    cyclicShift-n4                              INTEGER (0..11)
                }
            },
            resourceMapping                             SEQUENCE {
                startPosition                               INTEGER (0..5),
                nrofSymbols                                 ENUMERATED {n1, n2, n4},
                repetitionFactor                            ENUMERATED {n1, n2, n4}
            }'
            freqDomainPosition                      INTEGER (0..67),
            freqDomainShift                         INTEGER (0..268),
            freqHopping                             SEQUENCE {
                c-SRS                                   INTEGER (0..63),
                b-SRS                                   INTEGER (0..3),
```

```
    b-hop                           INTEGER (0..3)
  },
  groupOrSequenceHopping            ENUMERATED { neither, groupHopping,
  resourceType                      CHOICE {
    aperiodic                         SEQUENCE {
      ...
    },
    semi-persistent                   SEQUENCE {
      periodicityAndOffset-sp           SRS-PeriodicityAndOffset,
      ...
    },
    periodic                          SEQUENCE {
      periodicityAndOffset-p            SRS-PeriodicityAndOffset,
      ...
    }
  },
  sequenceId                        INTEGER (0..1023),
  spatialRelationInfo               SRS-SpatialRelationInfo
  ...
}

SRS-SpatialRelationInfo ::=   SEQUENCE {
  servingCellId                 ServeCellIndex
  referenceSignal               CHOICE {
    ssb-Index                     SSB-Index,
    csi-RS-Index                  NZP-CSI-RS-ResourceId,
    srs                           Sequence {
      resourceId                    SRS-ResourceId,
      uplinkBWP                     BWP-ID
    }
  }
}

SRS-ResourceID ::=            INTEGER (0..maxNrofSRS-Resources-1)

SRS-PeriodicityAndOffset ::=  CHOICE {
  sl1                           NULL,
  sl2                           INTEGER (0..1),
  sl4                           INTEGER (0..3),
  sl5                           INTEGER (0..4),
  sl8                           INTEGER (0..7),
  sl10                          INTEGER (0..9),
  sl16                          INTEGER (0..16),
  sl20                          INTEGER (0..19),
  sl32                          INTEGER (0..31),
  sl40                          INTEGER (0..39),
  sl64                          INTEGER (0..63),
  sl80                          INTEGER (0..79),
  sl160                         INTEGER (0..159),
  sl320                         INTEGER (0..319),
  sl640                         INTEGER (0..639),
  sl1280                        INTEGER (0..1279),
```

700 sequenceHopping },

OPTIONAL, -- Need R

OPTIONAL, -- Need R

| SRS-Resource field descriptions |
|---|
| *cyclicShift-n2*<br>Cyclic shift configuration |
| *cyclicShift-n4*<br>Cyclic shift configuration. |
| *freqHopping*<br>Includes parameter capturing SRS frequency hopping. |
| *groupOrSequenceHopping*<br>Parameter(s) for configuring group or sequence hopping. |
| *PeriodicityAndOffset-p*<br>Periodicity and slot offset for this SRS resource. All values in "number of slots" sl1 corresponds to a periodicity of 1 slot, value sl2 corresponds to a periodicity of 2 slots, and so on. For each periodicity the corresponding offset is given in number of slots. For periodicity sl1 the offset is 0 slots. |
| *PeriodicityAndOffset-sp*<br>Periodicity and slot offset for this SRS resource. All values in "number of slots". sl1 corresponds to a periodicity of 1 slot, value sl2 corresponds to a periodicity of 2 slots, and so on. For each periodicity the corresponding offset is given in number of slots. For periodicity sl1 the offset is 0 slots. |
| *ptrs-PortIndex*<br>The PTRS port index for this SRS resource for non-codebook based UL MIMO. This is only applicable when the corresponding PTRS-UplinkConfig is set to CP-OFDM. The ptrs-PortIndex configured here must be smaller than or equal to the maxNnrofPorts configured in the PTRS-UplinkConfig. |
| *resourceMapping*<br>OFDM symbol location of the SRS resource within a slot including number of OFDM symbols (N= 1, 2, or 4 per SRS resource), startPosition (SRSSymbolStartPosition = 0..5; "0" refers to the last symbol, "1" refers to the second last symbol) and RepetitionFactor (r=1, 2, or 4). The configured SRS resource does not exceed the slot boundary. |
| *resourceType*<br>Periodicity and offset for semi-persistent and periodic SRS resource. |
| *sequenceId*<br>Sequence ID used to initialize pseudo random group and sequence hopping. |
| *spatialRelationInfo*<br>Configuration of the spatial relation between a reference RS and the target SRS. Reference RS can be SSB/CSI-RS/SRS. |
| *TransmissionComb*<br>Comb value (2 or4) and comb offset (0..combValue-1). |

CONFIGURATION CONSTRAINTS FOR SOUNDING REFERENCE SIGNALS (SRS) FOR POSITIONING

CROSS-REFERENCE TO RELATED APPLICATIONS

The present Applications for patent claims the benefit of U.S. Provisional Application No. 62/891,813, entitled "CONFIGURATION CONSTRAINTS FOR SOUNDING REFERENCE SIGNALS (SRS) FOR POSITIONING," filed Aug. 26, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second (gps) to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving at least one of a first type of sounding reference signal (SRS) configuration or a second type of SRS configuration, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, and wherein the first higher layer protocol signaling is different from the second higher layer protocol signaling, and transmitting one or more SRS-for-positioning purposes based on the first type of SRS configuration or the second type of SRS configuration.

In an aspect, a UE includes a memory, at least one transceiver, and at least one processor communicatively coupled to the memory and the at least one transceiver, the at least one processor configured to: receive, via the at least one transceiver, at least one of a first type of SRS configuration or a second type of SRS configuration, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, and wherein the first higher layer protocol signaling is different from the second higher layer protocol signaling, and cause the at least one transceiver to transmit one or more SRS-for-positioning purposes based on the first type of SRS configuration or the second type of SRS configuration.

In an aspect, a UE includes means for receiving at least one of a first type of SRS configuration or a second type of SRS configuration, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, and wherein the first higher layer protocol signaling is different from the second higher layer protocol signaling, and means for transmitting one or more SRS-for-positioning purposes based on the first type of SRS configuration or the second type of SRS configuration.

In an aspect, a non-transitory computer-executable medium storing computer-executable instructions includes computer-executable instructions comprising at least one instruction instructing a UE to receive at least one of a first type of SRS configuration or a second type of SRS configuration, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, and wherein the first higher layer protocol signaling is different from the second higher layer protocol signaling, and at least one instruction instructing the UE to transmit one or more SRS-for-positioning purposes based on the first type of SRS configuration or the second type of SRS configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 5A to 5D are diagrams illustrating example frame structures and channels within the frame structures, according to aspects of the disclosure.

FIGS. 7A to 7C illustrate an exemplary SRS-Config information element (IE) for radio resource control (RRC), according to aspects of the disclosure.

FIG. 8 shows the SRS-Resource field descriptions in table format, according to aspects of the disclosure.

DETAILED DESCRIPTION

Figure 1:
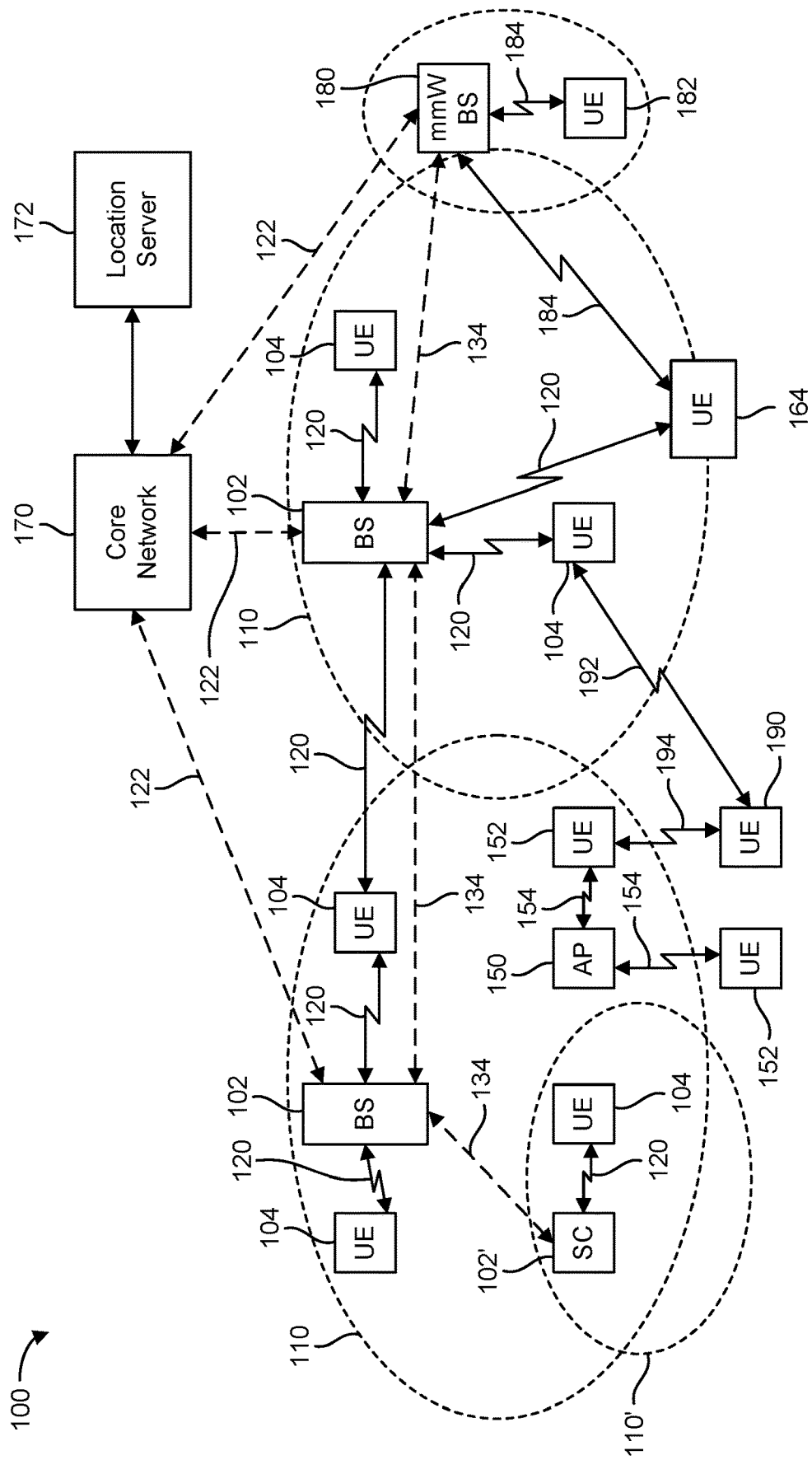
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., SSB) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
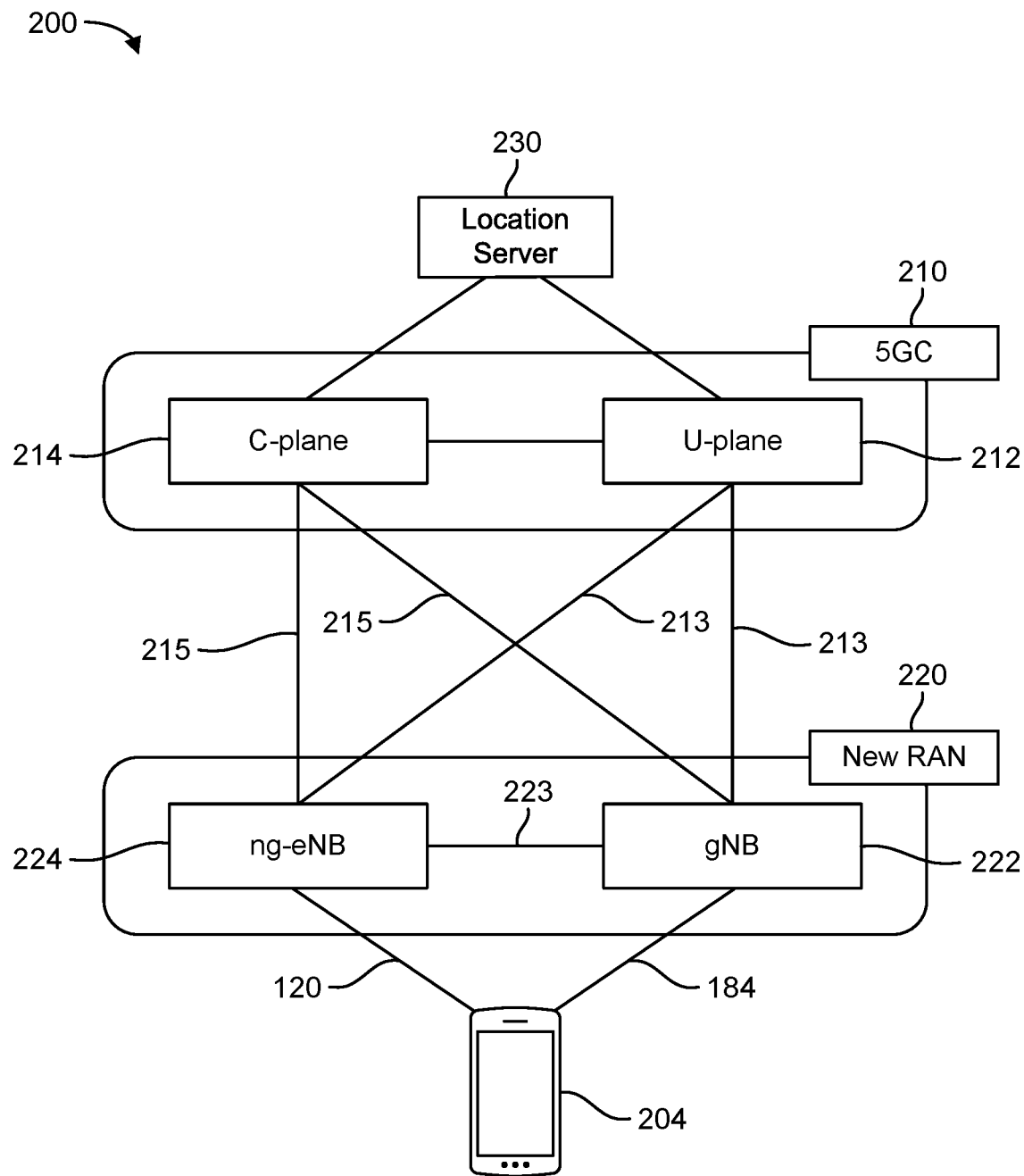
FIGS. 2A and 2B illustrate example wireless network structures, according to various aspects.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
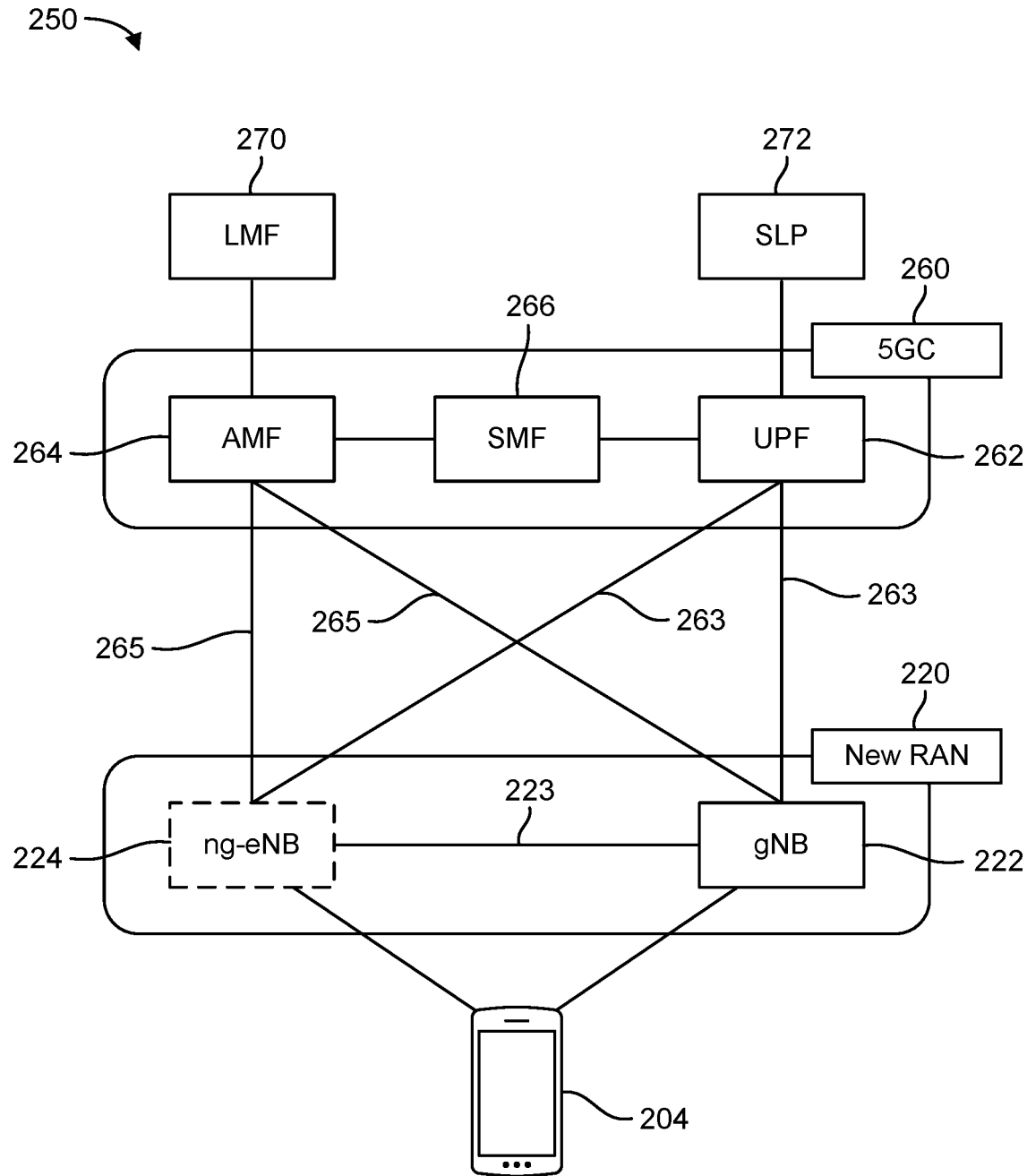

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
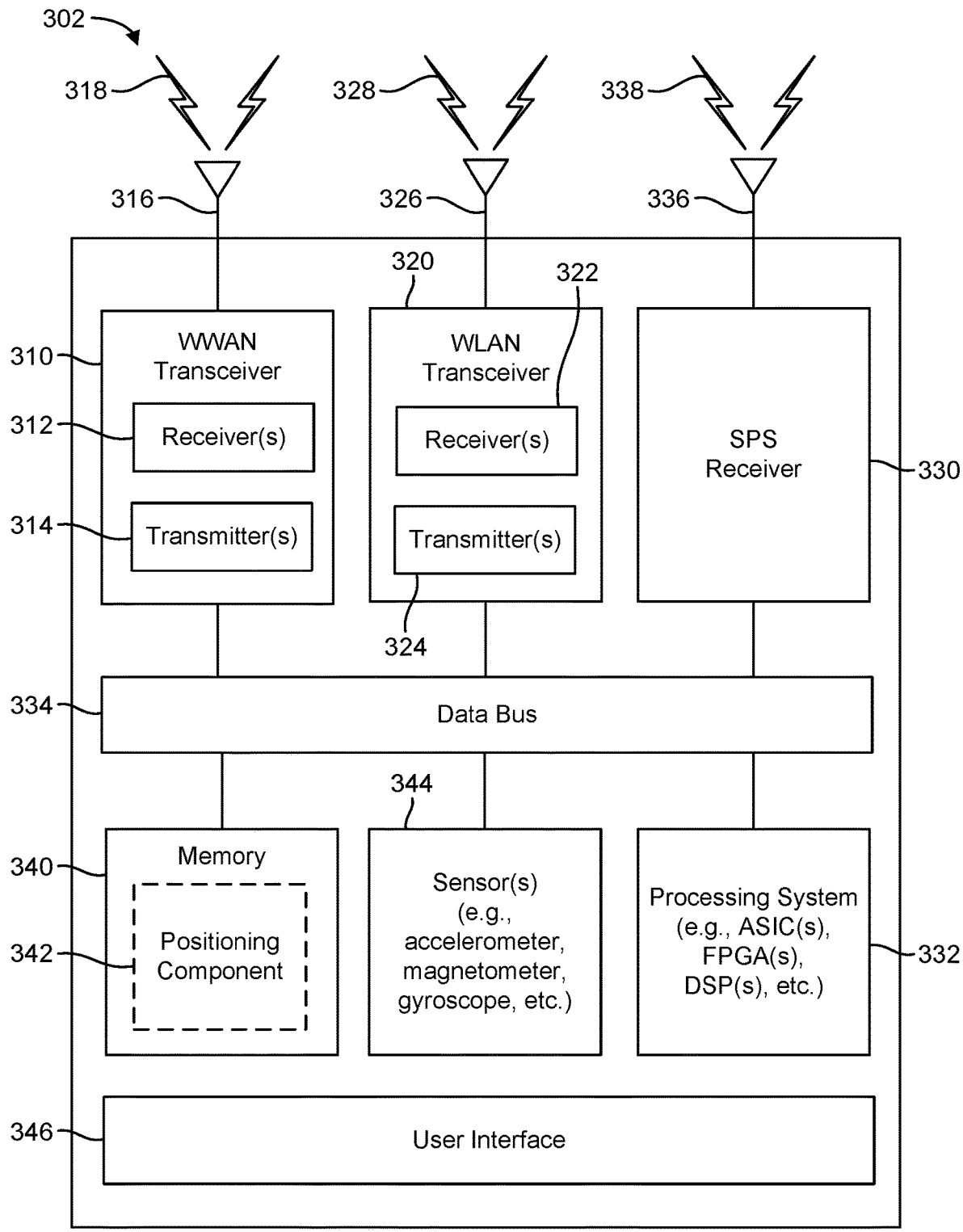
FIGS. 3A to 3C are simplified block diagrams of several sample aspects of components that may be employed in a UE, a base station, and a network entity, respectively.
Figure 3B:
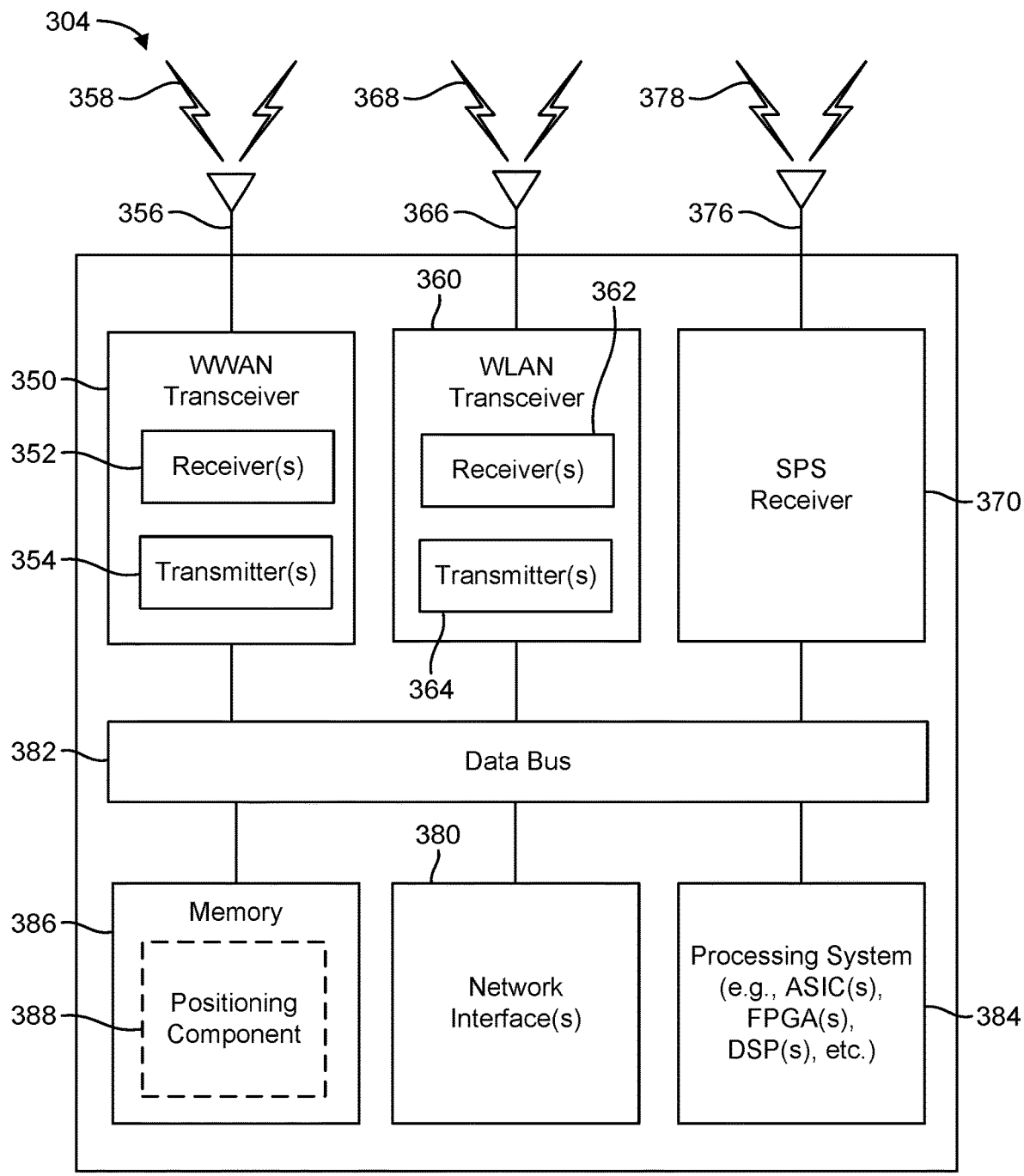
Figure 3C:
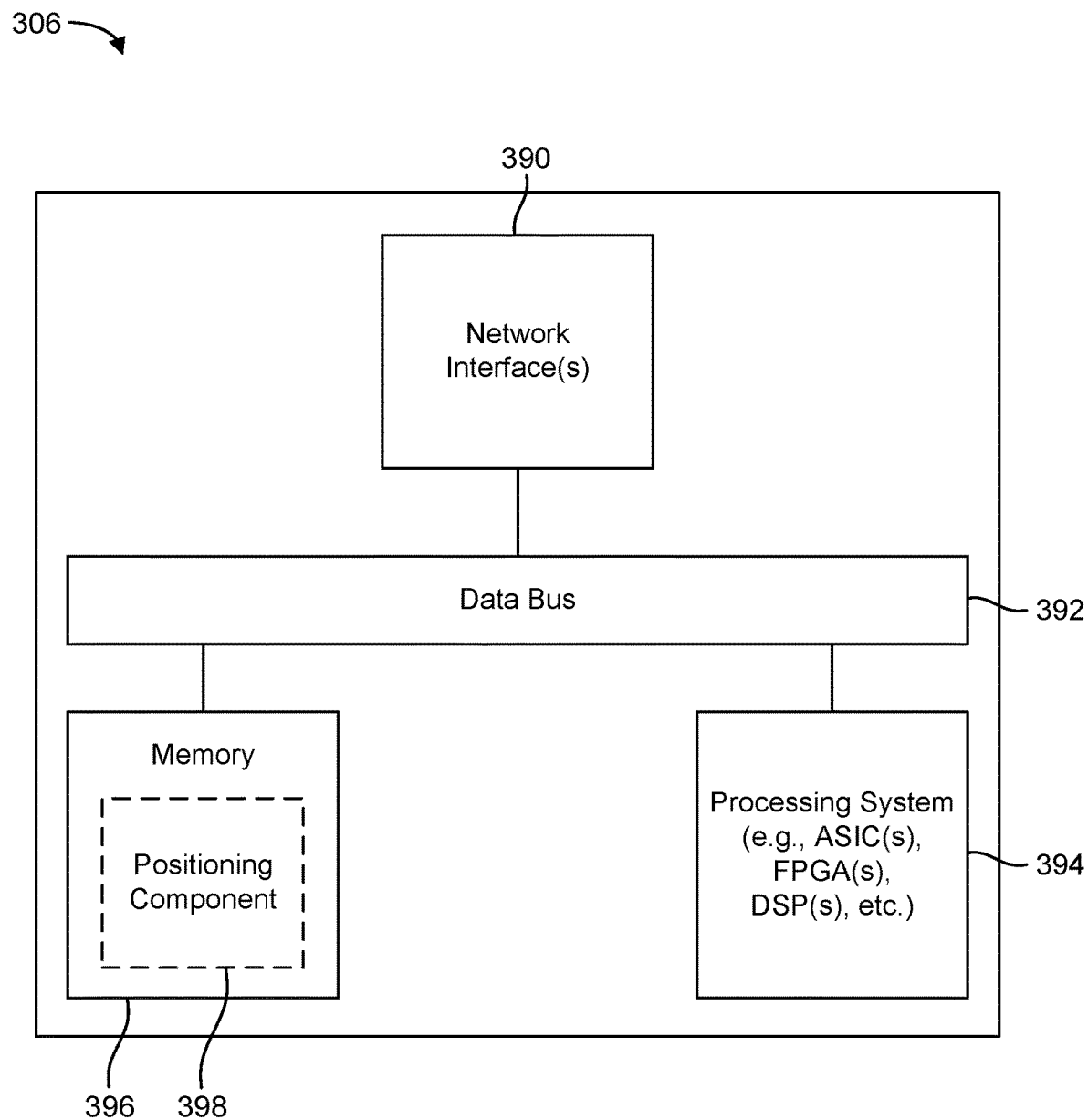

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modern processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modern processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
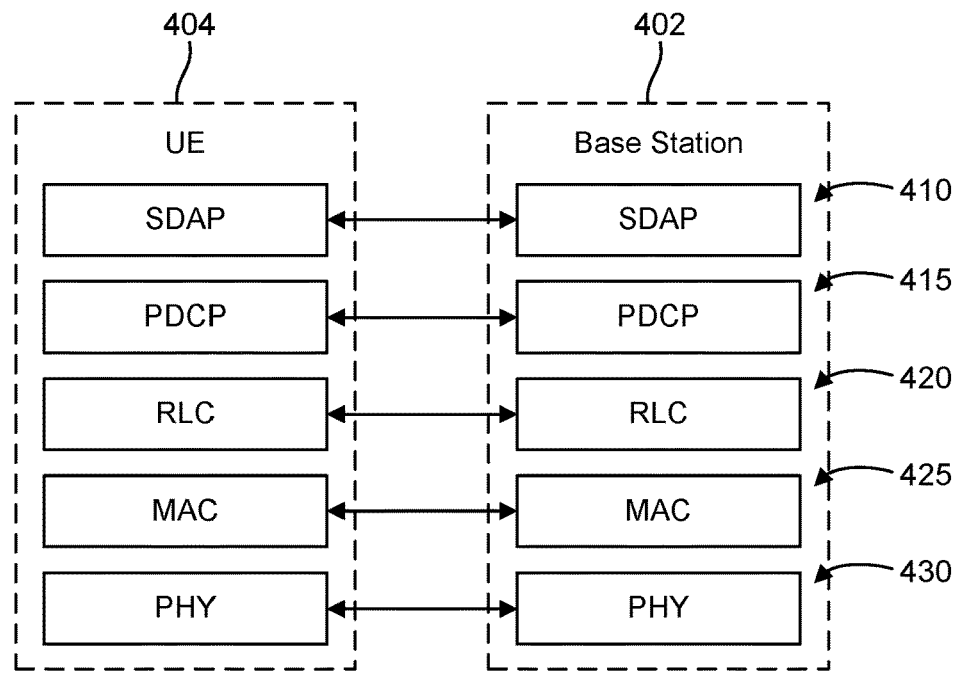
FIGS. 4A and 4B illustrate user plane and control plane protocol stacks, according to aspects of the disclosure.

FIG. 4A illustrates a user plane protocol stack, according to aspects of the disclosure. As illustrated in FIG. 4A, a UE 404 and a base station 402 (which may correspond to any of the UEs and base stations, respectively, described herein)

implement, from highest layer to lowest, a service data adaptation protocol (SDAP) layer 410, a PDCP layer 415, an RLC layer 420, a MAC layer 425, and a PHY layer 430. As illustrated by the double-arrow lines in FIG. 4A, each layer of the protocol stack implemented by the UE 404 communicates with the same layer of the base station 402, and vice versa. Collectively, the SDAP layer 410, the PDCP layer 415, the RLC layer 420, and the MAC layer 425 are referred to as "Layer 2" or "L2."

Figure 4B:
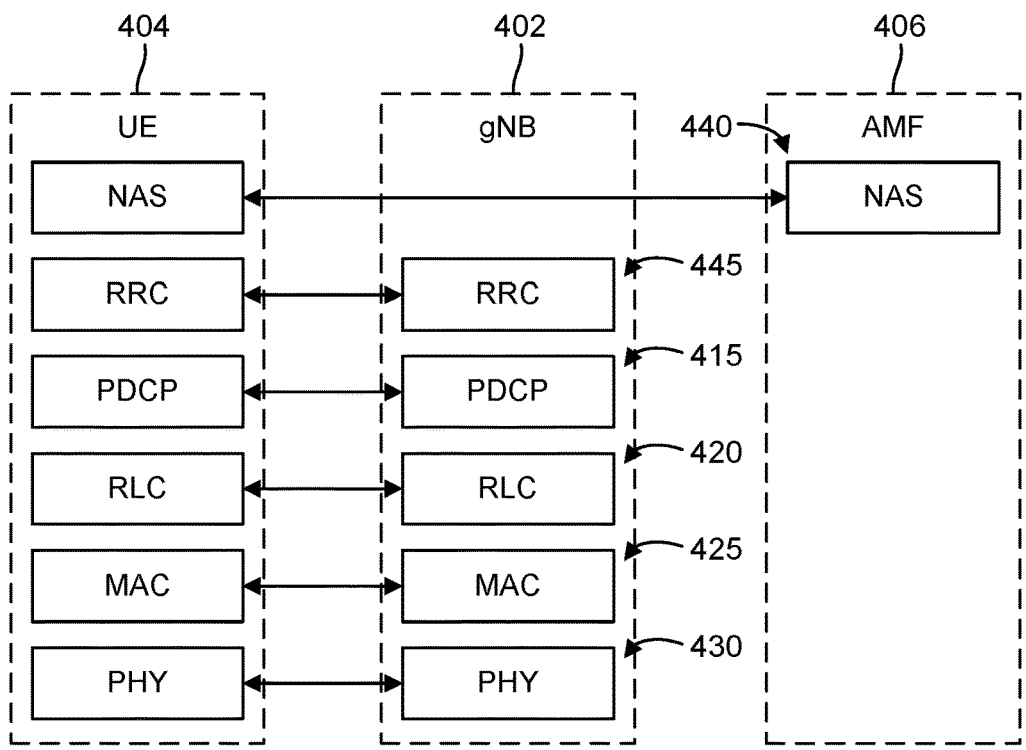

FIG. 4B illustrates a control plane protocol stack, according to aspects of the disclosure. In addition to the PDCP layer 415, the RLC layer 420, the MAC layer 425, and the PHY layer 430, the UE 404 and the base station 402 also implement an RRC layer 445. Further, the UE 404 and an AMF 406 (e.g., AMF 264) implement a NAS layer 440.

The main services and functions of the RLC layer 420 depend on the transmission mode and include transfer of upper layer PDUs, sequence numbering independent of the one in the PDCP layer 415, error correction through ARQ, segmentation and re-segmentation, reassembly of service data units (SDUs), RLC SDU discard, and RLC re-establishment. The ARQ functionality provides error correction in AM mode, and has the following characteristics: ARQ retransmits RLC PDUs or RLC PDU segments based on RLC status reports, polling for an RLC status report is used when needed by RLC, and the RLC receiver can also trigger an RLC status report after detecting a missing RLC PDU or RLC PDU segment.

The main services and functions of the PDCP layer 415 for the user plane include sequence numbering, header compression and decompression (for robust header compression (ROHC) only), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a QoS flow and a data radio bearer and marking QoS flow ID in both DL and UL packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain IP connectivity between the UE 404 and a packet data network. The NAS layer 440 performs EPS bearer management, authentication, EPS connection management (ECM)-IDLE mobility handling, paging origination in ECM-IDLE, and security control.

Figure 5A:
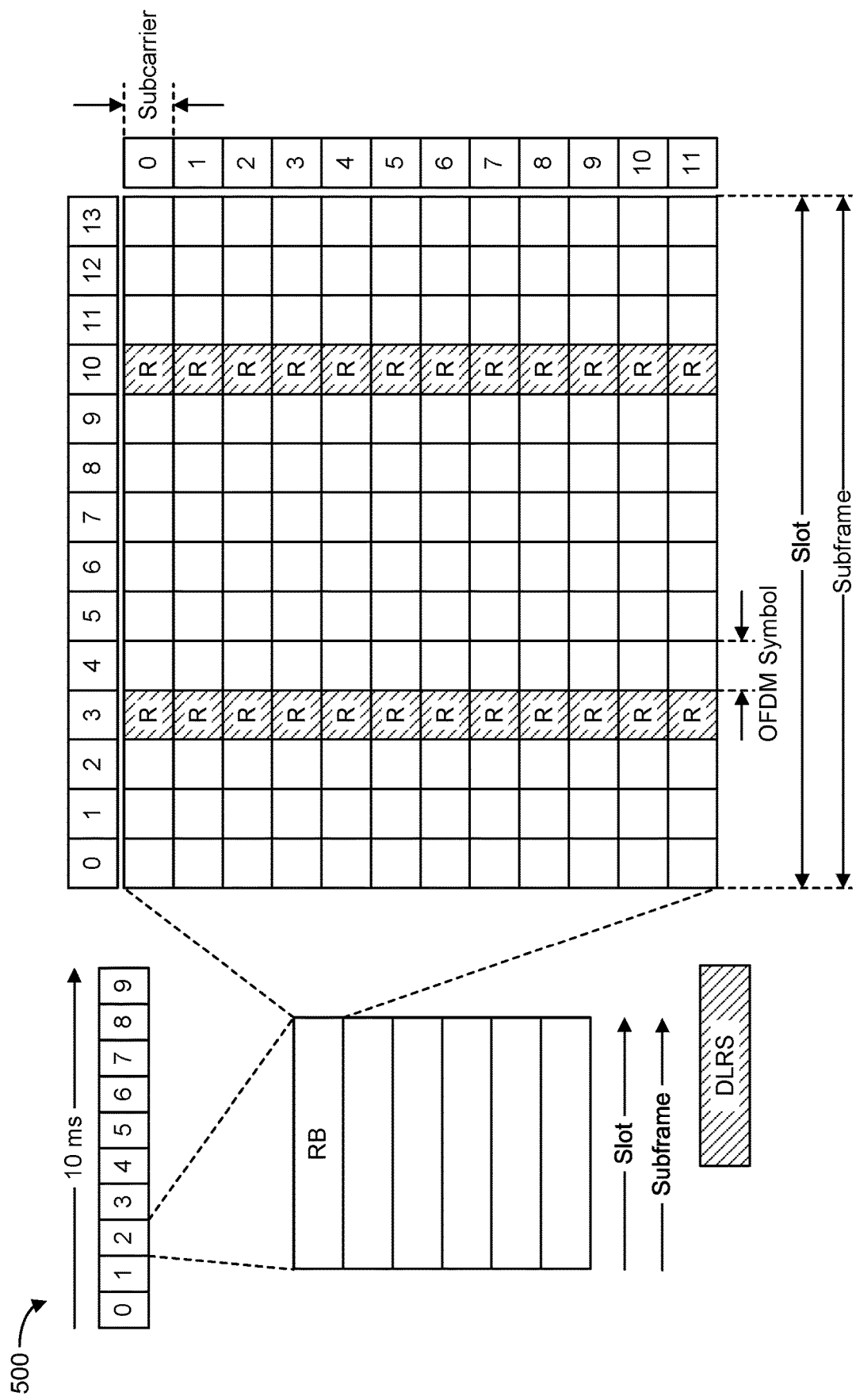
Figure 5B:
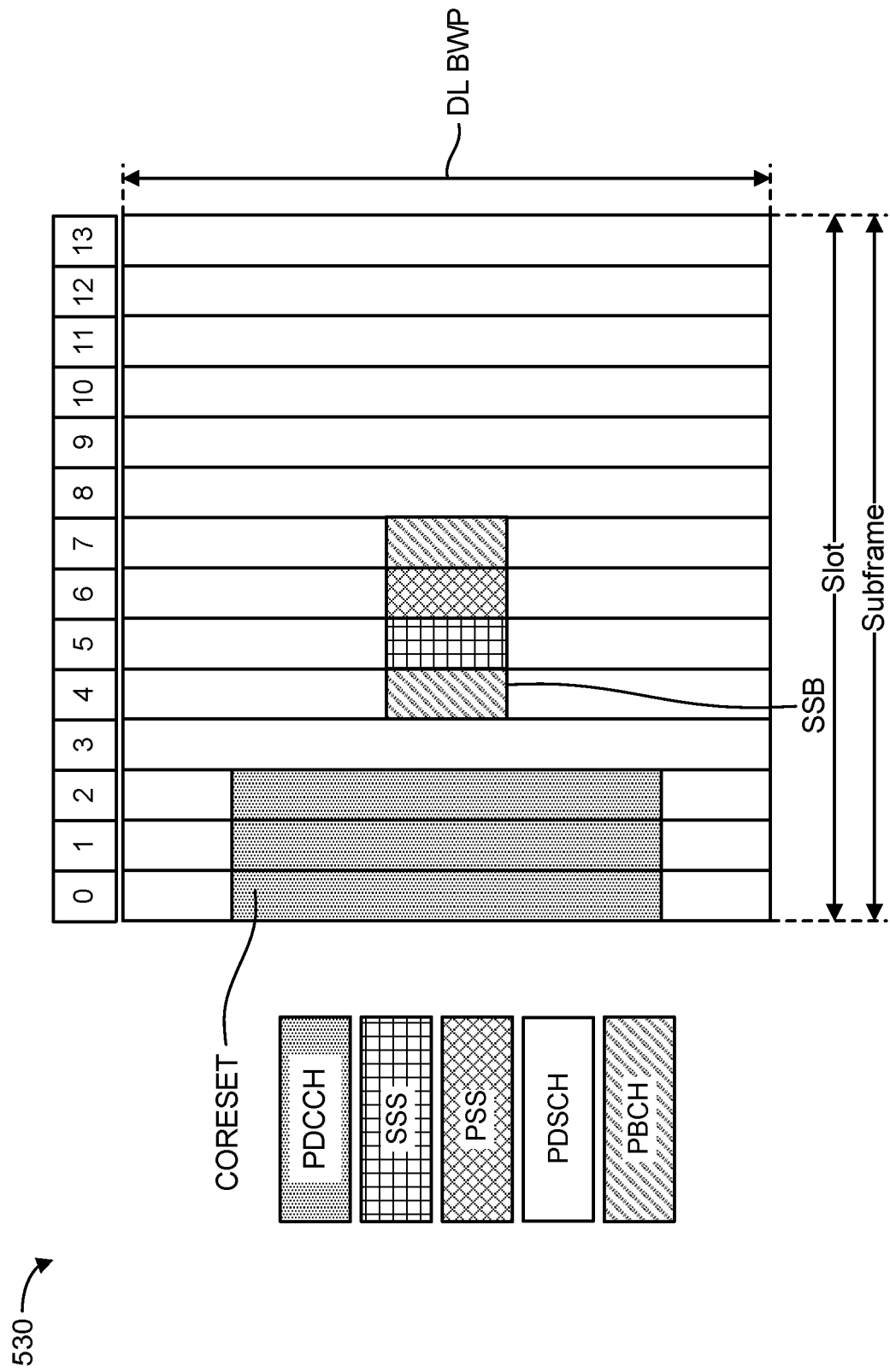
Figure 5C:
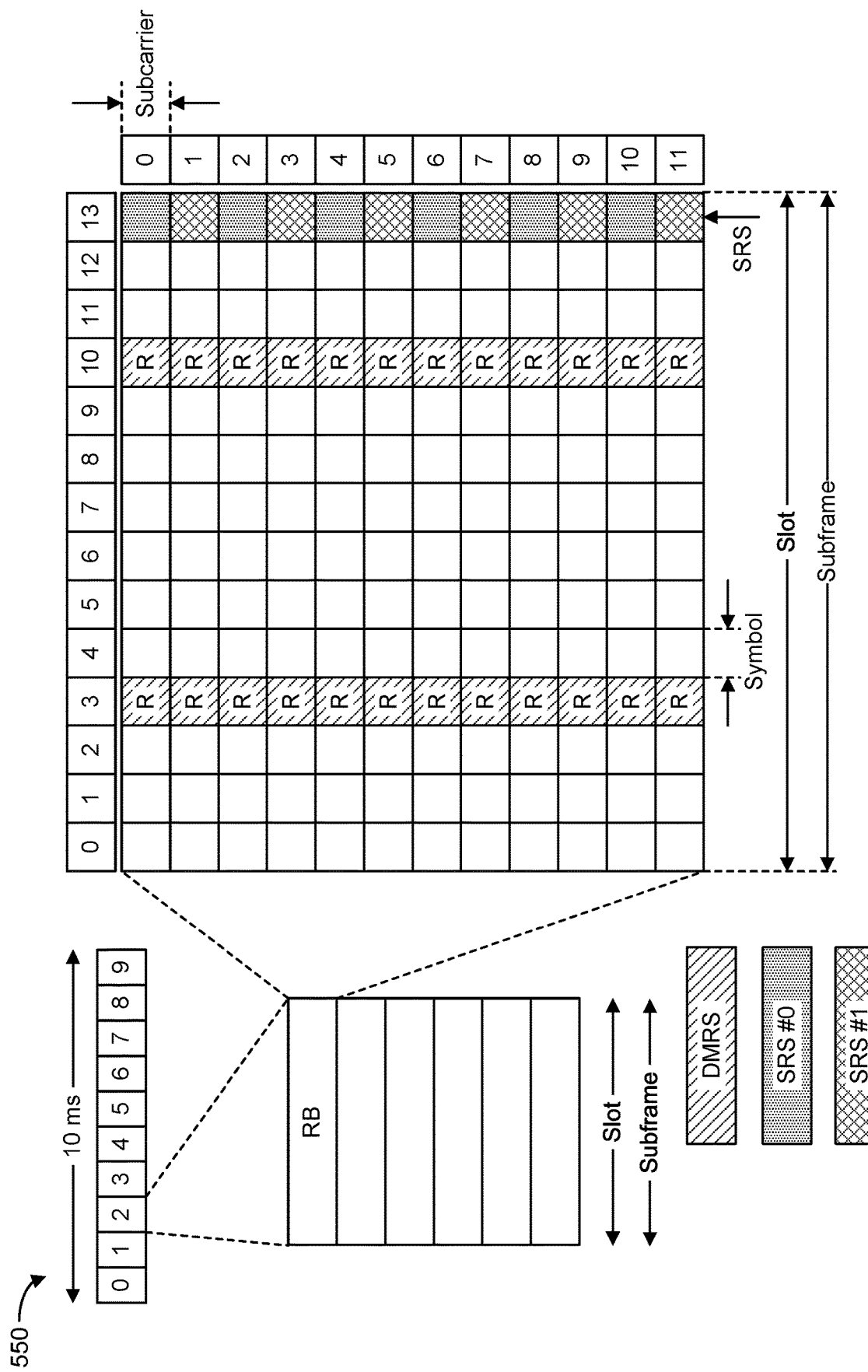

Various frame structures may be used to support downlink and uplink transmissions between network nodes (e.g., base stations and UEs). FIG. 5A is a diagram 500 illustrating an example of a downlink frame structure, according to aspects of the disclosure. FIG. 5B is a diagram 530 illustrating an example of channels within the downlink frame structure, according to aspects of the disclosure. FIG. 5C is a diagram 550 illustrating an example of an uplink frame structure, according to aspects of the disclosure. FIG. 5D is a diagram 580 illustrating an example of channels within an uplink frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/Sot | Slots/Sub-frame | Slots/Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 5A to 5D, a numerology of 15 kHz is used. Thus, in the time domain, a frame (e.g., 10 ms) is divided into 10 equally sized subframes of 1 ms each, and each subframe includes one time slot. In FIGS. 5A to 5D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 5A to 5D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 5A, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 5A.

A collection of resource elements (REs) that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS in 5G, TRS, CRS, CSI-RS, DMRS, PSS, SSS, SSB, etc.

FIG. 5B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 5C, some of the REs carry DMRS for channel estimation at the base station. The UE may additionally transmit SRS in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 5A, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 5D illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UL-TDOA), multi-round-trip-time (multi-RTT), angle-of-arrival (AoA), etc.

Several enhancements over the previous definition of SRS have been proposed for SRS-for-positioning, such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLossReference are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

There are a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of downlink reference signals (e.g., PRS, TRS, NRS, CSI-RS, SSBs, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include UL-TDOA and uplink angle-of-arrival (UL-AoA). UL-TDOA is similar to OTDOA and DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-RTT positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal ID, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

OTDOA and DL-TDOA positioning methods need precise timing synchronization across the involved base stations. That is, the start of each downlink radio frame must begin at precisely the same time, or have some known offset from a reference time. In NR, however, there may not be a requirement for precise timing synchronization across base stations. Instead, it may be sufficient to have coarse time-synchronization across base stations (e.g., within a cyclic prefix (CP) duration of the OFDM symbols). RTT-based methods generally only need coarse timing synchronization, and as such, are a common positioning method in NR.

Multi-RTT was introduced above. In greater detail, in a network-centric multi-RTT location estimation, the serving base station instructs the UE to, or notifies the UE that it may, scan for/receive RTT measurement signals from the cells/TRPs of two or more neighboring base stations (and typically the serving base station, as at least three base stations are needed). The involved cells/TRPs transmit RTT measurement signals via low reuse resources (e.g., time-frequency resources used by the cell/TRP to transmit system information) allocated by the network (e.g., location server 230, LMF 270). The UE records the ToA of each RTT measurement signal relative to the UE's current downlink timing (as derived by the UE from a downlink reference signal received from its serving cell/TRP), and transmits a common or individual RTT response message to the involved cells/TRPs (e.g., when instructed by its serving cell/TRP). The RTT response message(s) may include the differences between the ToAs of the RTT measurement signals and the transmission time(s) of the RTT response message(s), referred to as the UE Rx-Tx measurement, or $T_{Rx \to Tx}$ (e.g., $T_{Rx \to Tx}$ 612 in FIG. 6). The RTT response message includes an uplink reference signal (e.g., SRS, DMRS, UL-PRS) that the involved cells/TRPs can use to deduce the ToA of the RTT response message. By comparing the difference between the transmission time of the RTT measurement signal and the ToA of the RTT response message, referred to as the BS Tx-Rx measurement, or $T_{Tx \to Rx}$ (e.g., $T_{Tx \to Rx}$ 622 in FIG. 6), to the UE Rx-Tx measurement, the positioning entity (e.g., location server 230, LMF 270, the serving base station, the UE) can determine the propagation time, or time of flight, between each base station and the UE. From the propagation time, the positioning entity can calculate the distance between the UE and each base station by assuming the speed of light during this propagation time.

A UE-centric multi-RTT location estimation is similar to the network-based method, except that the UE transmits uplink RTT measurement signal(s) that are received by the cells/TRPs of multiple base stations within communication range of the UE (e.g., the serving cell/TRP and neighboring cells/TRPs). In an aspect, the serving cell/TRP may instruct the UE to transmit the uplink RTT measurement signal(s). Instructing the UE may include scheduling the uplink time-frequency resources on which the UE is to transmit the uplink RTT measurement signal(s). Alternatively, the serving cell/TRP may notify the UE that it may transmit the RTT measurement signal(s), and the notification may include an indication of the resources that can be used. Each involved cell/TRP responds to reception of the uplink RTT measurement signal(s) with a downlink RTT response message, which may include the ToA of the RTT measurement signal at the cell/TRP in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the arrival (or receive) time(s) of the first message(s) or signal(s) in the RTT response message(s) payload.

Figure 6:
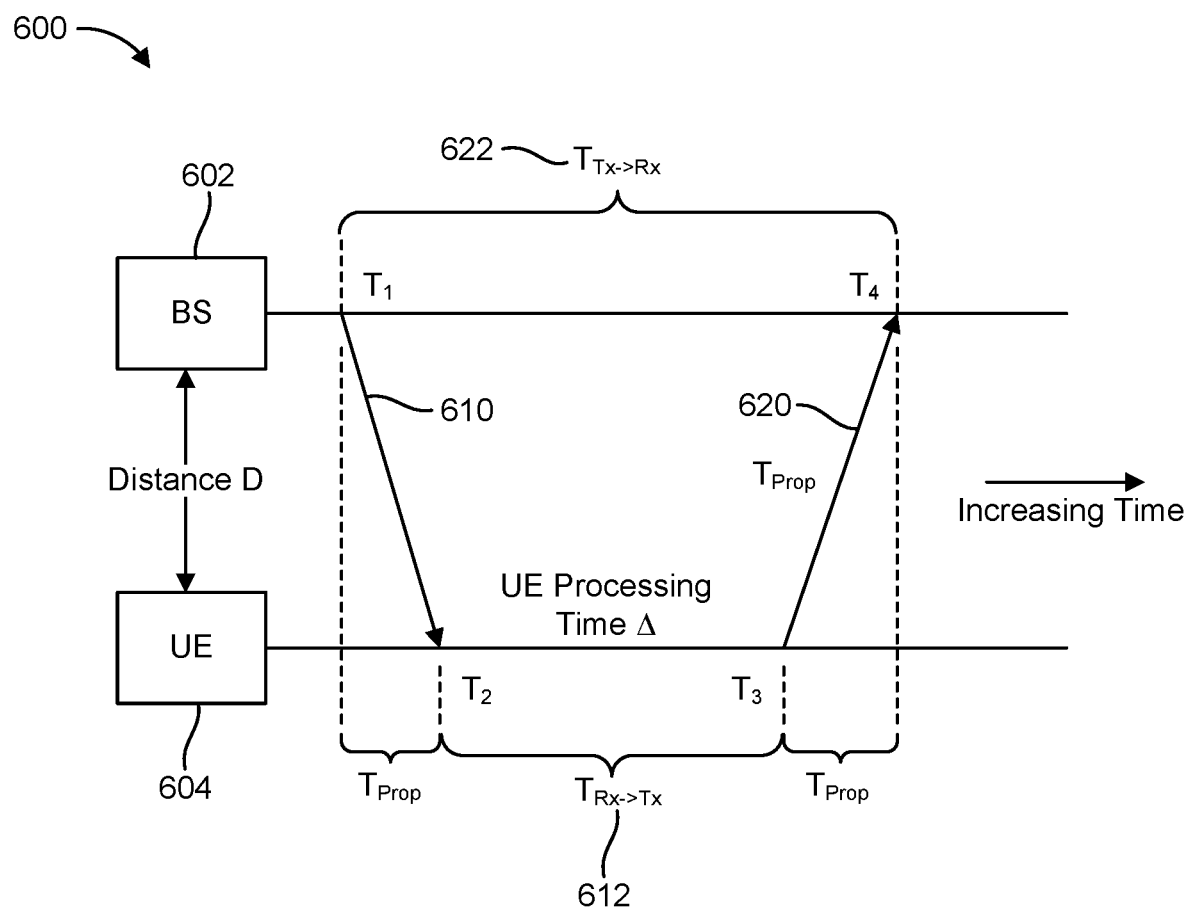
FIG. 6 is a diagram showing exemplary timings of round-trip-time (RTT) measurement signals exchanged between a base station and a UE, according to aspects of the disclosure.

FIG. 6 is a diagram 600 showing exemplary timings of RTT signals exchanged between a cell/TRP of a base station 602 (which may correspond to any of the base stations described herein) and a UE 604 (which may correspond to any of the UEs described herein), according to aspects of the disclosure. In the example of FIG. 6, the cell/TRP of the base station 602 sends an RTT measurement signal 610 (e.g., PRS, NRS, CRS, CSI-RS, SSB, etc.) to the UE 604 at time $T_1$. The RTT measurement signal 610 has some propagation delay $T_{Prop}$ as it travels from the cell/TRP of the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 (e.g., SRS, DMRS, UL-PRS) at time $T_3$. After the propagation delay $T_{Prop}$, the cell/TRP of the base station 602 receives/measures the RTT response signal 620 from the UE 604 at time $T_4$ (the ToA of the RTT response signal 620 at the base station 602).

In order to identify the ToA (e.g., $T_2$) of a reference signal (e.g., an RTT measurement signal 610) transmitted by a given network node (e.g., base station 602), the receiver (e.g., UE 604) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may chose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

The RTT response signal 620 may explicitly include the difference between time $T_3$ and time $T_2$ (i.e., $T_{Rx \to Tx}$ 612). Alternatively, it may be derived from the timing advance (TA), that is, the relative uplink/downlink frame timing and specification location of uplink reference signals. (Note that the TA is usually the RTT between the base station and the UE, or double the propagation time in one direction.) Using this measurement and the difference between time $T_4$ and time $T_1$ (i.e., $T_{Tx \to Rx}$ 622), the positioning entity can calculate the distance to the UE 604 as:

$$d = \frac{1}{2c}(T_{Tx \to Rx} - T_{Rx \to Tx}) = \frac{1}{2c}(T_4 - T_1) - \frac{1}{2c}(T_3 - T_2)$$

where c is the speed of light.

Figure 7A:
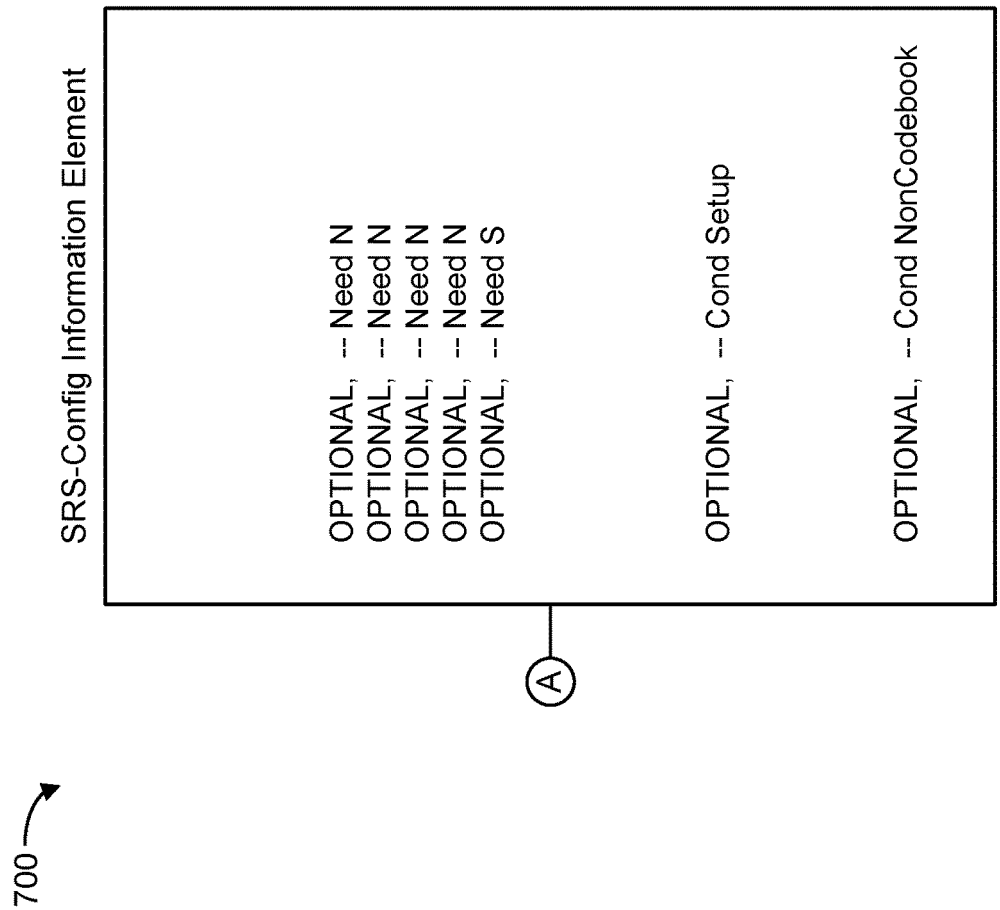
Figure 7B:
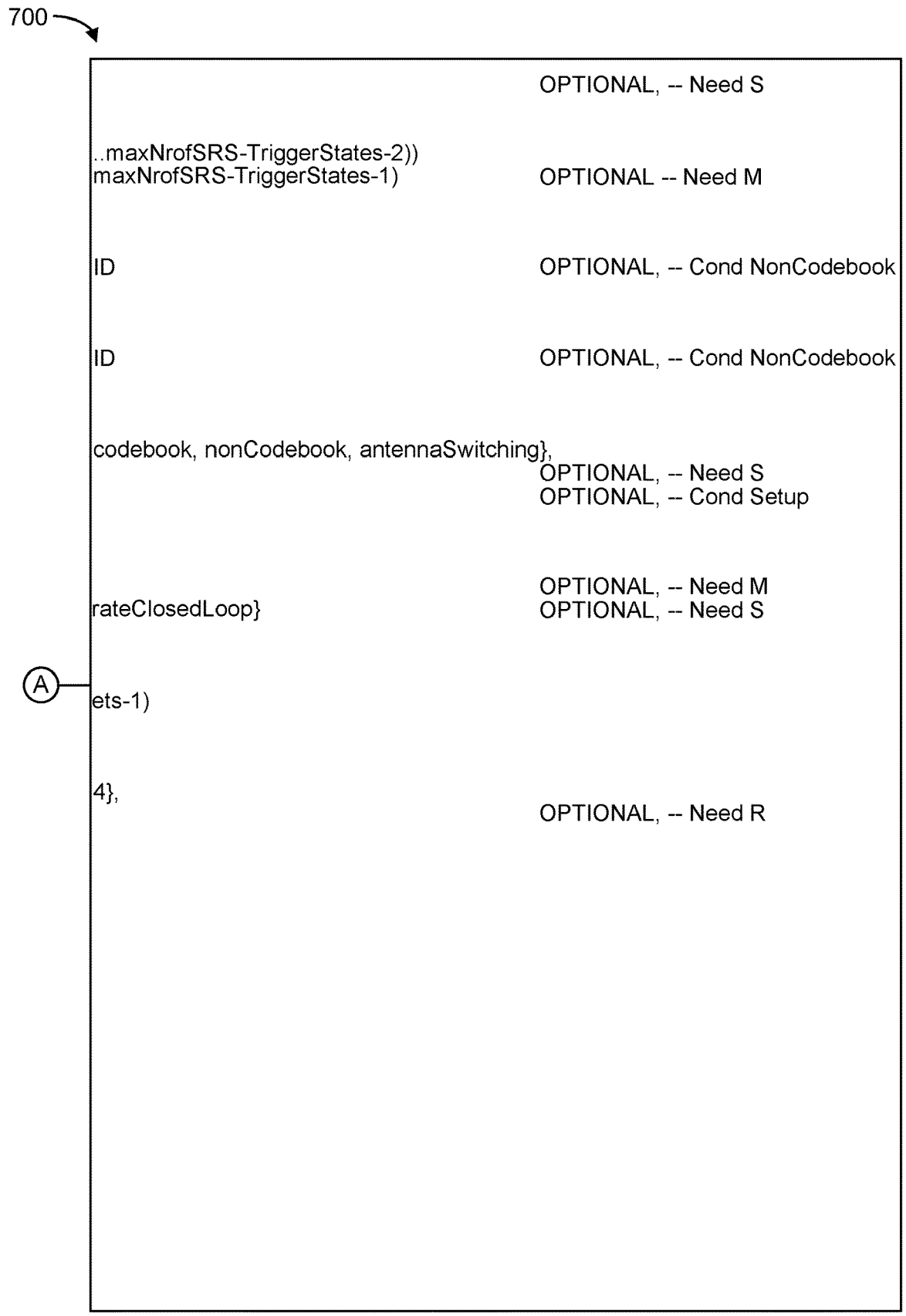

Referring to further details of SRS configurations, FIGS. 7A to 7C illustrate an exemplary SRS-Config IE 700 for RRC. The SRS-Config IE is used to configure SRS transmissions. The configuration defines a list of SRS-Resources and a list of SRS-ResourceSets. Each resource set defines a set of SRS-Resources. The network triggers the transmission of the set of SRS-Resources using a configured aperiodic SRS-Resource Trigger (L1 DCI). FIG. 8 illustrates a table 800 showing the SRS-Resource field descriptions.

Figure 9:
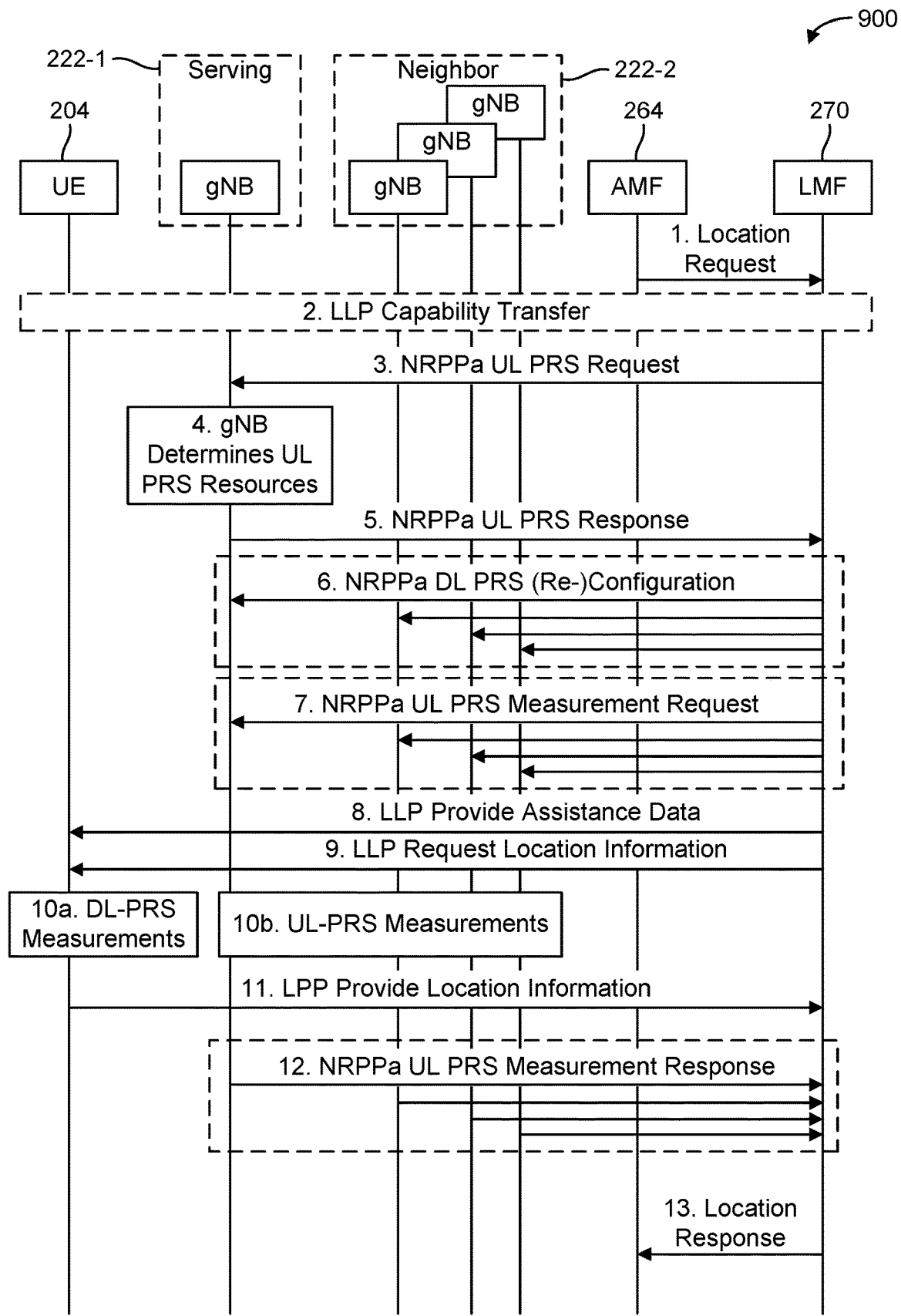
FIG. 9 is an LTE positioning protocol (LLP)-based diagram of SRS-for-positioning, according to aspects of the disclosure.

FIG. 9 is a diagram 900 illustrating an LPP-based configuration of SRS-for-positioning, according to aspects of the disclosure. In an aspect, the LPP-based configuration may be performed by the network nodes illustrated in FIGS. 2A and 2B. The positioning method utilized may be a downlink and uplink-based positioning method, such as a multi-RTT procedure, as described above with reference to FIG. 6.

At stage 1, the AMF 264 sends a location request for a UE 204 to the LMF 270. In response, at stage 2, the LMF 270 performs a positioning capability transfer (e.g., an LPP capability transfer) with the UE 204. The positioning capability transfer may include identifiers of neighboring base stations (e.g., gNBs 222-2), which may be some or all of the base stations, other than the serving base station (e.g., serving gNB 222-1), detectable by the UE 204. At stage 3, the LMF 270 sends the serving gNB 222-1 a request (e.g., a New Radio positioning protocol type A (NRPPa) UL-PRS request) to determine uplink resources on which the UE 204 can transmit UL-PRS (e.g., SRS). At stage 4, the serving gNB 222-1 determines the UL-PRS resources. At stage 5, the serving gNB 222-1 sends the LMF 270 a response message (e.g., an NRPPa UL-PRS response message) indicating the determined UL-PRS resources with which the UE 204 can be configured.

At stage 6, the LMF 270 sends a DL-PRS configuration message (or reconfiguration message if DL-PRS have previously been configured), such as an NRPPa DL-PRS configuration or reconfiguration message, to each involved base station (e.g., serving gNB 222-1 and neighboring gNBs 222-2) defining the DL-PRS configuration to be used by each base station to transmit PRS to the UE 204. At stage 7, the LMF 270 sends an UL-PRS measurement request (e.g., an NRPPa UL-PRS measurement request) to each involved base station indicating the uplink resources (determined at stages 3 to 5) on which the UE 204 will be transmitting the UL-PRS (e.g., SRS). The UL-PRS measurement request may also indicate the type of positioning measurement to be made of each UL-PRS, such as ToA, base station Tx-Rx, signal strength, and/or the like.

At stage 8, the LMF 270 sends location assistance data to the UE 204 in, for example, an LPP Provide Assistance Data message. The location assistance data may include the identifiers of the base stations to measure (e.g., serving gNB 222-1 and neighboring gNBs 222-2) and the DL-PRS configuration used by each base station, among other information. At stage 9, the LMF 270 sends a request for location information (e.g., an LPP Request Location Information message) to the UE 204. The request for location information may include a request for positioning measurements of the DL-PRS transmitted by the involved base stations, such as the ToA of each DL-PRS, the UE Rx-Tx associated with each base station, the signal strength of each DL-PRS, and/or the like.

At stage 10a, the UE 204 measures the DL-PRS from the involved base stations (e.g., serving gNB 222-1 and neighboring gNBs 222-2) based on the associated PRS configurations. At stage 10b, the involved base stations (e.g., serving gNB 222-1 and neighboring gNBs 222-2) measure the UL-PRS (e.g., SRS) from the UE 204.

At stage 11, the UE 204 provides the requested location information to the LMF 270 in, for example, an LPP Provide Location Information message. Similarly, at stage 12, the involved base stations (e.g., serving gNB 222-1 and neighboring gNBs 222-2) provide the requested measurements to the LMF 270 in, for example, NRPPa UL PRS measurement responses. The LMF 270 can then estimate the location of the UE 204 based on the reported measurements. At stage 13, the LMF 270 sends a location response, including the location estimate, to the AMF 264.

Figure 10:
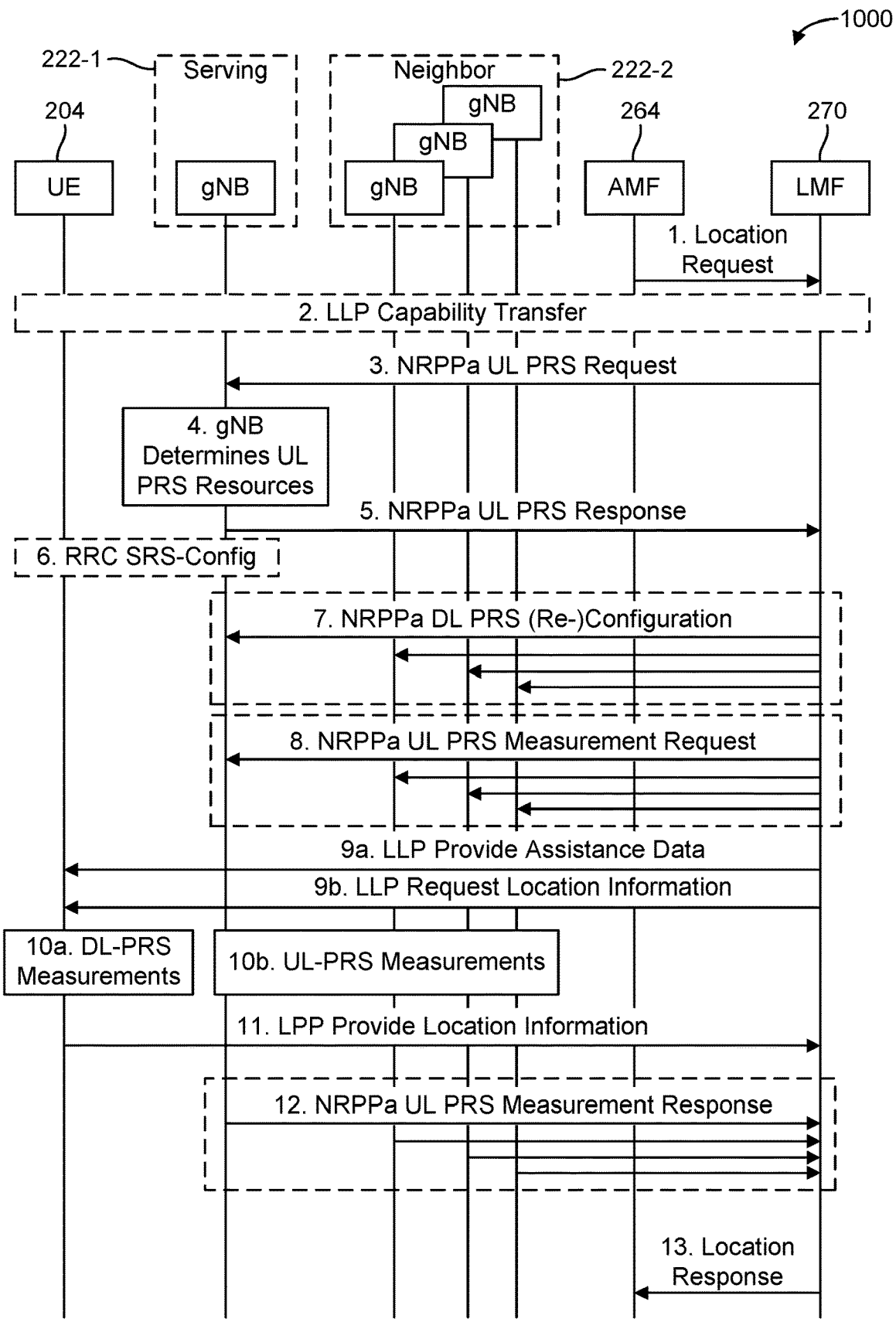
FIG. 10 is an RRC-based diagram of SRS-for-positioning, according to aspects of the disclosure.

FIG. 10 is a diagram 1000 illustrating an RRC-based configuration of SRS-for-positioning, according to aspects of the disclosure. In an aspect, the RRC-based configuration may be performed by the network nodes illustrated in FIGS. 2A and 2B. The positioning method utilized may be a downlink and uplink-based positioning method, such as a multi-RTT procedure, as described above with reference to FIG. 6.

At stage 1, the AMF 264 sends a location request for a UE 204 to the LMF 270. In response, at stage 2, the LMF 270 performs a positioning capability transfer (e.g., an LPP capability transfer) with the UE 204. The positioning capability transfer may include identifiers of neighboring base stations (e.g., gNBs 222-2), which may be some or all of the base stations, other than the serving base station (e.g., serving gNB 222-1), detectable by the UE 204. At stage 3, the LMF 270 sends the serving gNB 222-1 a request (e.g., a New Radio positioning protocol type A (NRPPa) UL-PRS request) to determine uplink resources on which the UE 204 can transmit UL-PRS (e.g., SRS). At stage 4, the serving gNB 222-1 determines the UL-PRS resources. At stage 5, the serving gNB 222-1 sends the LMF 270 a response message (e.g., an NRPPa UL-PRS response message) indicating the determined UL-PRS resources with which the UE 204 can be configured.

At stage 6, the serving gNB 222-1 performs an RRC SRS configuration procedure with the UE 206. More specifically, the serving gNB 222-1 sends an RRC SRS-Config IE (as illustrated in FIGS. 7A to 7C) to the UE 206 configuring the UE 206 with uplink resources on which to transmit SRS.

At stage 7, the LMF 270 sends a DL-PRS configuration message (or reconfiguration message if DL-PRS have previously been configured), such as an NRPPa DL-PRS configuration or reconfiguration message, to each involved base station (e.g., serving gNB 222-1 and neighboring gNBs 222-2) defining the DL-PRS configuration to be used by each base station to transmit PRS to the UE 204. At stage 8, the LMF 270 sends an UL-PRS measurement request (e.g., an NRPPa UL-PRS measurement request) to each involved base station indicating the uplink resources (determined at stages 3 to 5) on which the UE 204 will be transmitting the UL-PRS (e.g., SRS). The UL-PRS measurement request may also indicate the type of positioning measurement to be made of each UL-PRS, such as ToA, base station Tx-Rx, signal strength, and/or the like.

At stage 9a, the LMF 270 sends location assistance data to the UE 204 in, for example, an LPP Provide Assistance Data message. The location assistance data may include the identifiers of the base stations to measure (e.g., serving gNB 222-1 and neighboring gNBs 222-2) and the DL-PRS configuration used by each base station, among other information. At stage 9b, the LMF 270 sends a request for location information (e.g., an LPP Request Location Information message) to the UE 204. The request for location information may include a request for positioning measurements of the DL-PRS transmitted by the involved base stations, such as the ToA of each DL-PRS, the UE Rx-Tx associated with each base station, the signal strength of each DL-PRS, and/or the like.

At stage 10a, the UE 204 measures the DL-PRS from the involved base stations (e.g., serving gNB 222-1 and neighboring gNBs 222-2) based on the associated PRS configurations. At stage 10b, the involved base stations (e.g., serving gNB 222-1 and neighboring gNBs 222-2) measure the UL-PRS (e.g., SRS) from the UE 204.

At stage 11, the UE 204 provides the requested location information to the LMF 270 in, for example, an LPP Provide Location Information message. Similarly, at stage 12, the involved base stations (e.g., serving gNB 222-1 and neighboring gNBs 222-2) provide the requested measurements to the LMF 270 in, for example, NRPPa UL PRS measurement responses. The LMF 270 can the estimate the location of the UE 204 based on the reported measurements. At stage 13, the LMF 270 sends a location response, including the location estimate, to the AMF 264.

There are various reasons to prefer LPP over RRC for configuring UL-PRS (e.g., SRS). For example, at least two parameters in the SRS configuration (the path loss reference and spatial relation information parameters) cannot be determined by the serving base station (e.g., gNB 222-1), meaning they cannot be configured using RRC. As another example, activation of UL-PRS should only be required once all selected base stations have been configured for UL-PRS measurements and have accepted the UL-PRS measurement request (e.g., after stage 7 in FIG. 9). In contrast, as shown in FIG. 10, the RRC SRS configuration (at stage 6) occurs before the neighboring base stations receive DL-PRS configurations (at stage 7) and measurement requests (at stage 8) from the LMF 270. The serving base station cannot autonomously activate or deactivate the UL-PRS.

As yet another example, configuring the UL-PRS through LPP rather than RRC (the previous SRS mechanism) enables a more robust positioning procedure with regard to UE mobility. As still another example, collision rules can be defined if an SRS resource configured through RRC collides with an SRS resource configured through LPP (similar rules were defined for SRS resources with different time-domain behavior). The main reason to use RRC is that it can be backward compatible to legacy UEs (i.e., UEs not operating according to, or not capable of operating according to, an NR RAT) when UL-TDOA is being used as a positioning method.

Accordingly, the present disclosure provides techniques to enable SRS-for-positioning to be configured by both RRC and LPP. However, the RRC configuration would contain a subset of available configuration options/features compared to the SRS configured through LPP.

Since the main reason to use RRC is that it can be backward compatible with legacy UEs when UL-TDOA is being used as a positioning method, the present disclosure provides techniques whereby an SRS used for positioning can be configured through RRC only under one or more particular constraints. These constraints include (1) that UL-TDOA or AoA-based positioning methods are the only positioning procedures configured to the UE, (2) that SRS resources are configured without frequency domain staggering across consecutive OFDM symbols, (3) that spatial relation information is configured for a downlink reference signal from the serving cell, (4) that a path loss reference signal is configured for a downlink reference signal from the serving cell, (5) that an SRS resource is always configured only within a BWP configured through RRC, (6) that SRS resources are transmitted only within an active BWP configured through RRC, (7) that an SRS resource can only be transmitted within a single component carrier in any OFDM symbol, or any combination thereof. If one or more of these constraints are met, an SRS used for positioning can be configured through RRC.

In contrast, for an SRS used for positioning configured through LPP, the configurations/features not supported in RRC can be configured through LPP. For example, a UE configured with SRS resources used for multi-RTT would need to be configured with an SRS through LPP. As another example, configuring SRS resources with frequency domain staggering across consecutive OFDM symbols is possible if the SRS are configured through LPP, but is not possible if the SRS resources are configured through RRC. As yet another example, the path loss reference or spatial relation information parameters can be derived based on a downlink reference signal resource from a neighboring TRP if configured by LLP, but not if configured by RRC. As another example, a higher number of SRS resource sets can be configured if LPP is used compared to the case that RRC is used. As still another example, an SRS configured in LPP can be transmitted simultaneously across multiple component carriers in one OFDM symbol, but not for an SRS configured through RRC. As another example, an SRS configured through LPP can be configured outside the BWPs of the component carrier, but not for an SRS configured through RRC. As yet another example, SRS can be transmitted outside an active BWP of the component carrier if the SRS are configured through LPP.

Thus, if a UE supports configuring SRS-for-positioning via LPP, then the location server can configure the UE with SRS-for-positioning using LPP. But, if the UE is a legacy UE that does not support configuring SRS-for-positioning via LPP, then the location server can configure the UE with SRS-for-positioning using RRC. However, the parameters of the SRS configuration will be more restrictive for an RRC configuration than for an LPP configuration, as described above.

Figure 11:
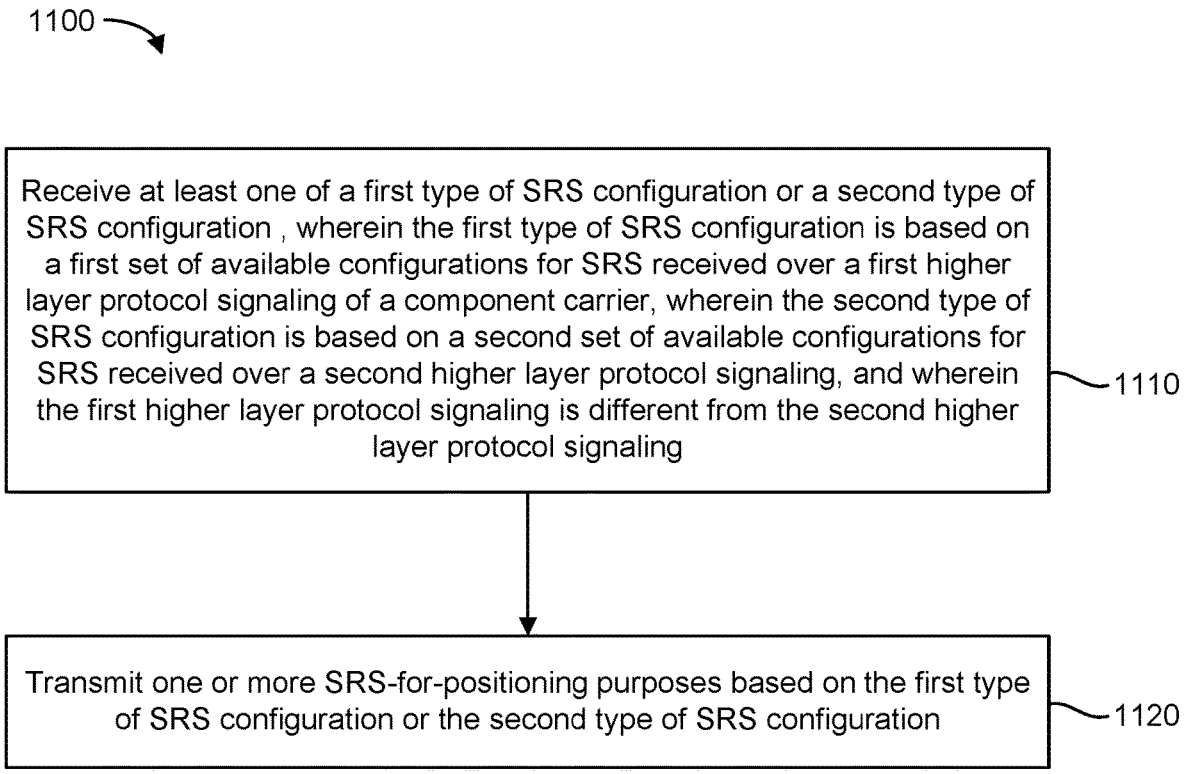
FIG. 11 illustrates an exemplary method of wireless communication, according to aspects of the disclosure.

FIG. 11 illustrates an exemplary method 1100 of wireless communication, according to aspects of the disclosure. The method 100 may be performed by a UE (e.g., any of the UEs described herein).

At 1110, the UE receives at least one of a first type of SRS configuration (e.g., from a serving base station, such as any of the base stations described herein) or a second type of SRS configuration (e.g., from a location server, such as location server 230, LMF 270, or SLP 272). In an aspect, the first type of SRS configuration may be based on a first set of available configurations for SRS received over a first higher layer protocol signaling (e.g., RRC signaling) of a component carrier. In an aspect, the second type of SRS configuration may be based on a second set of available configurations for SRS received over a second higher layer protocol signaling (e.g., LPP signaling). In an aspect, the first higher layer protocol signaling may be different from the second higher layer protocol signaling (e.g., RRC signaling and LPP signaling). In an aspect, operation 1110 may be performed by WWAN transceiver 310, processing system 332, memory component 340, and/or positioning component 342, any or all of which may be considered means for performing this operation.

At 1120, the UE transmits one or more SRS-for-positioning purposes based on the first type of SRS configuration or the second type of SRS configuration. In an aspect, operation 1120 may be performed by WWAN transceiver 310, processing system 332, memory component 340, and/or positioning component 342, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
receiving at least one of a first type of sounding reference signal (SRS) configuration from a base station or a second type of SRS configuration from a location server, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, wherein the second set of available configurations for SRS includes SRS configurations not supported by the first set of available configurations for SRS, and wherein the first higher layer protocol signaling is different from the second higher layer protocol signaling; and
transmitting one or more SRS-for-positioning based on the first type of SRS configuration or the second type of SRS configuration.

2. The method of claim 1, wherein the base station is a serving base station.

3. The method of claim 1, wherein the first higher layer protocol signaling comprises radio resource control (RRC) signaling.

4. The method of claim 3, wherein the UE receives the first type of SRS configuration over the RRC signaling based on the UE not operating according to a fifth generation (5G) New Radio (NR) radio access technology (RAT).

5. The method of claim 1, wherein the second higher layer protocol signaling comprises Long-Term Evolution (LTE) positioning protocol (LPP) signaling.

6. The method of claim 5, wherein the UE receives the second type of SRS configuration over the LPP signaling based on the UE operating according to a fifth generation (5G) New Radio (NR) radio access technology (RAT).

7. The method of claim 1, wherein the first set of available configurations for SRS is used at least for positioning purposes.

8. The method of claim 1, wherein the first set of available configurations for SRS is a subset of the second set of available configurations for SRS.

9. The method of claim 1, wherein the first set of available configurations for SRS is subject to one or more constraints based on being received over the first higher layer protocol signaling.

10. The method of claim 9, wherein the one or more constraints comprise:
only uplink time difference of arrival (UL-TDOA) or angle of arrival (AoA) positioning procedures are configured to the UE,
SRS resources are configured without frequency domain staggering across consecutive orthogonal frequency division multiplexing (OFDM) symbols,
spatial relation information is configured to a downlink reference signal from a serving base station,
a path loss reference is configured to a downlink reference signal from the serving base station,
SRS resources are configured only within a bandwidth part configured through RRC,
SRS resources are transmitted only within an active bandwidth part configured through RRC,
SRS resources are only transmitted within a single component carrier in any OFDM symbol, or
any combination thereof.

11. The method of claim 1, wherein the SRS configurations not supported by the first set of available configurations for SRS comprise:
SRS resources used for a multi-round-trip-time (RTT) positioning procedure,
SRS resources configured with frequency domain staggering across consecutive OFDM symbols,
a path loss reference or spatial relation information derived based on a downlink reference resource received from one or more neighboring transmission-reception points (TRPs),
a higher number of SRS resource sets configured inside the component carrier,
SRS transmitted simultaneously across multiple component carriers in one OFDM symbol,
SRS configured outside a bandwidth part (BWP) of the component carrier,
SRS transmitted outside an active BWP of the component carrier, or
any combination thereof.

12. A user equipment (UE), comprising:
a memory;
at least one transceiver; and
at least one processor communicatively coupled to the memory and the at least one transceiver, the at least one processor configured to:
receive, via the at least one transceiver, at least one of a first type of sounding reference signal (SRS) configuration from a base station or a second type of SRS configuration from a location server, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, wherein the second set of available configurations for SRS includes SRS configurations not supported by the first set of available configurations for SRS, and wherein the first higher layer protocol signaling is different from the second higher layer protocol signaling; and
cause the at least one transceiver to transmit one or more SRS-for-positioning based on the first type of SRS configuration or the second type of SRS configuration.

13. The UE of claim 12, wherein the base station is a serving base station.

14. The UE of claim 13, wherein the second higher layer protocol signaling comprises Long-Term Evolution (LTE) positioning protocol (LPP) signaling.

15. The UE of claim 14, wherein the UE receives the second type of SRS configuration over the LPP signaling based on the UE operating according to a fifth generation (5G) New Radio (NR) radio access technology (RAT).

16. The UE of claim 12, wherein the first higher layer protocol signaling comprises radio resource control (RRC) signaling.

17. The UE of claim 16, wherein the UE receives the first type of SRS configuration over the RRC signaling based on the UE not operating according to a fifth generation (5G) New Radio (NR) radio access technology (RAT).

18. The UE of claim 12, wherein the first set of available configurations for SRS is used at least for positioning purposes.

19. The UE of claim 12, wherein the first set of available configurations for SRS is a subset of the second set of available configurations for SRS.

20. The UE of claim 12, wherein the first set of available configurations for SRS is subject to one or more constraints based on being received over the first higher layer protocol signaling.

21. The UE of claim 20, wherein the one or more constraints comprise:
- only uplink time difference of arrival (UL-TDOA) or angle of arrival (AoA) positioning procedures are configured to the UE,
- SRS resources are configured without frequency domain staggering across consecutive orthogonal frequency division multiplexing (OFDM) symbols,
- spatial relation information is configured to a downlink reference signal from a serving base station,
- a path loss reference is configured to a downlink reference signal from the serving base station,
- SRS resources are configured only within a bandwidth part configured through RRC,
- SRS resources are transmitted only within an active bandwidth part configured through RRC,
- SRS resources are only transmitted within a single component carrier in any OFDM symbol, or
- any combination thereof.

22. The UE of claim 12, wherein the SRS configurations not supported by the first set of available configurations for SRS comprise:
- SRS resources used for a multi-round-trip-time (RTT) positioning procedure,
- SRS resources configured with frequency domain staggering across consecutive OFDM symbols,
- a path loss reference or spatial relation information derived based on a downlink reference resource received from one or more neighboring transmission-reception points (TRPs),
- a higher number of SRS resource sets configured inside the component carrier,
- SRS transmitted simultaneously across multiple component carriers in one OFDM symbol,
- SRS configured outside a bandwidth part (BWP) of the component carrier,
- SRS transmitted outside an active BWP of the component carrier, or
- any combination thereof.

23. A user equipment (UE), comprising:
- means for receiving at least one of a first type of sounding reference signal (SRS) configuration from a base station or a second type of SRS configuration from a location server, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, wherein the second set of available configurations for SRS includes SRS configurations not supported by the first set of available configurations for SRS, and wherein the first higher layer protocol signaling is different from the second higher layer protocol signaling; and
- means for transmitting one or more SRS-for-positioning based on the first type of SRS configuration or the second type of SRS configuration.

24. The UE of claim 23, wherein:

the base station is a serving base station, and the first higher layer protocol signaling comprises radio resource control (RRC) signaling.

25. The UE of claim 23, wherein:

the second higher layer protocol signaling comprises Long-Term Evolution (LTE) positioning protocol (LPP) signaling.

26. A non-transitory computer-executable medium storing computer-executable instructions, the computer-executable instructions comprising:
- at least one instruction instructing a user-equipment (UE) to receive at least one of a first type of sounding reference signal (SRS) configuration from a base station or a second type of SRS configuration from a location server, wherein the first type of SRS configuration is based on a first set of available configurations for SRS received over a first higher layer protocol signaling of a component carrier, wherein the second type of SRS configuration is based on a second set of available configurations for SRS received over a second higher layer protocol signaling, wherein the second set of available configurations for SRS includes SRS configurations not supported by the first set of available configurations for SRS, and wherein the first higher layer protocol signaling is different from the second higher layer protocol signaling; and
- at least one instruction instructing the UE to transmit one or more SRS-for-positioning based on the first type of SRS configuration or the second type of SRS configuration.

* * * * *